United States Patent [19]

Moog et al.

[11] 4,071,077

[45] Jan. 31, 1978

[54] HEATING SYSTEM FOR BUILDING

[75] Inventors: Gerhard W. Moog, Toronto; Kenneth R. Cooper, Don Mills, both of Canada

[73] Assignee: Canada Square Management Ltd., Toronto, Canada

[21] Appl. No.: 718,715

[22] Filed: Aug. 30, 1976

Related U.S. Application Data

[62] Division of Ser. No. 579,341, May 21, 1975, Pat. No. 4,049,045.

[51] Int. Cl.² .......................................... F24D 11/00
[52] U.S. Cl. .................................. 165/18; 126/400; 165/104 S
[58] Field of Search ............. 165/18, 104 S; 62/430, 62/438; 126/400

[56] References Cited

U.S. PATENT DOCUMENTS

| | | | |
|---|---|---|---|
| 2,528,449 | 10/1950 | Norton | 165/104 S |
| 2,538,015 | 1/1951 | Kleist | 62/430 |
| 2,677,243 | 5/1954 | Telkes | 62/430 |
| 2,713,252 | 7/1955 | Jackson et al. | 165/18 |
| 3,259,175 | 7/1966 | Kraus et al. | 165/12 |
| 3,276,516 | 10/1966 | Japhet | 165/62 |
| 3,556,201 | 1/1971 | Sander | 165/12 |
| 3,608,625 | 9/1971 | Kendrick | 165/29 |
| 3,935,899 | 2/1976 | Jolly | 165/29 |
| 3,987,786 | 10/1976 | Keyes et al. | 126/400 |

OTHER PUBLICATIONS

"Modern Air Conditioning, Heating, and Ventilating," by Carrier et al., Pitman Publishing Corporation, 3rd Edition, 1959, pp. 203, 204.

*Primary Examiner*—Charles J. Myhre
*Assistant Examiner*—Sheldon Richter
*Attorney, Agent, or Firm*—Rogers, Bereskin & Parr

[57] ABSTRACT

A combined heating and cooling system for a building is described. The system includes a heating circuit and a cooling circuit. The circuits are coupled to heat energy storage reservoirs. Each reservoir defines an elongate flow path along which water can flow in the form of a column. Using heat from the heating circuit, one or more of the reservoirs can be charged with hot water which is stored in the reservoir(s). The stored hot water is subsequently used to boost the temperature in the heating circuit. Similarly, water cooled by the cooling circuit can be stored in other reservoir(s) for subsequent use in boosting the cooling action of the cooling circuit. A heating system or a cooling system may also be provided.

8 Claims, 9 Drawing Figures

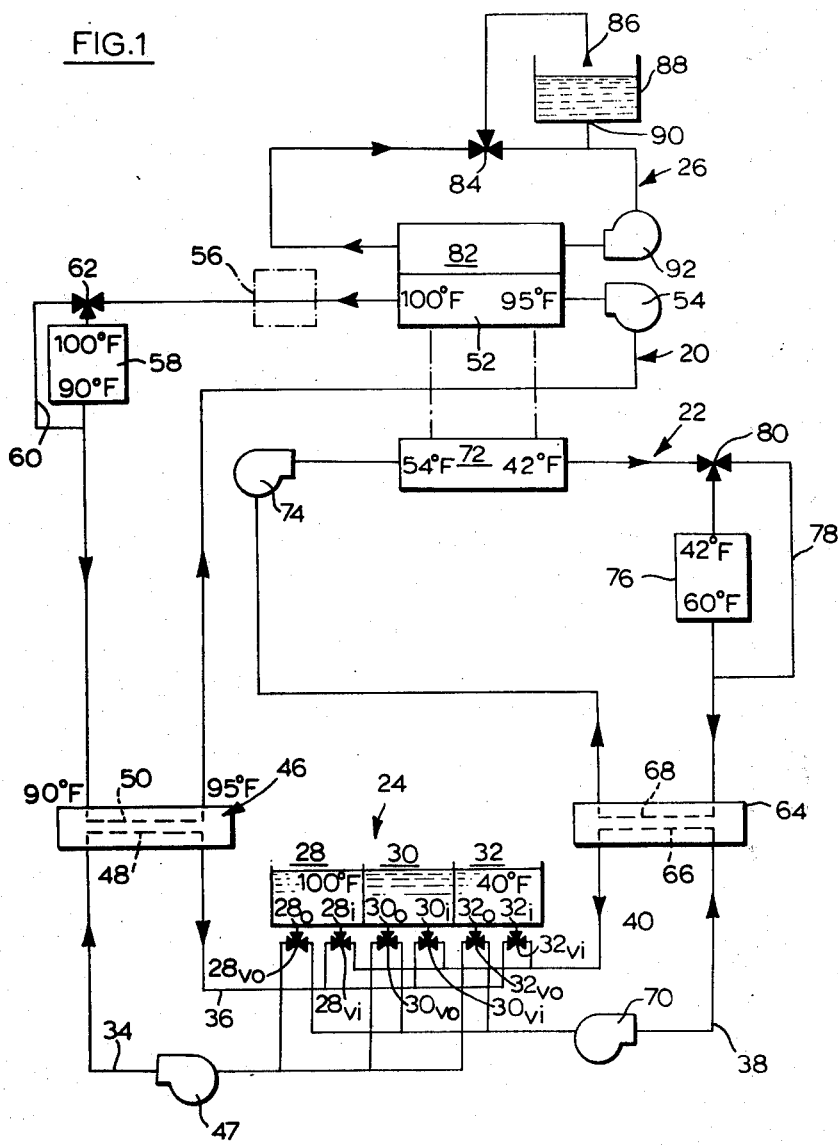

HEATING SYSTEM FOR BUILDING

This is a division of application Ser. No. 579,341, filed May 21, 1975, now U.S. Pat. No. 4,049,045.

This invention relates generally to heating and cooling systems for buildings.

According to the invention there is provided a system for controlling the temperature in a building having a building heating load or a building cooling load. The system includes a circuit for a temperature control fluid, the building load being connectible in said circuit so that the said fluid can pass through the building load. The circuit includes means for varying the heat energy in the fluid, and means for circulating the fluid unidirectionally in the circuit. The system also includes a heat energy storage reservoir containing a fluid. The reservoir comprises a tank having a plurality of upright baffles disposed in spaced, generally parallel positions, each baffle extending from the bottom of the tank to a position above the level of the fluid, and from an upright wall of the tank to a position spaced from an opposite upright wall so that the baffles together define an elongate flow path of serpentine form along which the fluid can flow in the form of a column in a generally horizontal direction, the tank having an inlet connection communicating with one end of said path and an outlet connection communicating with the opposite end of said path. Heat exchange means are coupled in said circulation circuit between the heat energy varying means and the building load. The inlet and outlet connections of the reservoir are coupled with said heat exchange means to form a circulation circuit for the said fluid so that heat energy can be transferred between the fluid in said circulation circuit and the fluid in the said temperature control circuit. Means are provided for displacing the said fluid along said flow path of the reservoir and through the heat exchange means. In use, heat energy can be transferred between said fluids in the heat exchange means and stored in the fluid in the reservoir for subsequent transfer back to the fluid in said temperature control circuit to assist the action of said heat energy varying means.

It will be appreciated that the expression "heat energy" is appropriate in reference to both heating and cooling. Referring, for example, to the temperature control fluid, the heat energy level in the fluid is high when heating and is low when cooling.

The expression "heating load" as used in this application in relation to a building refers to the total of all sources of heat loss from a heating system to the building. For example, the heating load for a particular building might consist of a series of hot water radiators and pipes. Similarly, the expression "cooling load" refers to the total of all sources of heat loss from the building to a cooling system.

The invention will be better understood by reference to the accompanying drawings which illustrate one embodiment of the invention by way of example. In the drawings:

FIG. 1 is a diagrammatic illustration of a heating and cooling system for a building, the system including three heat energy storage reservoirs;

Figure 1A:
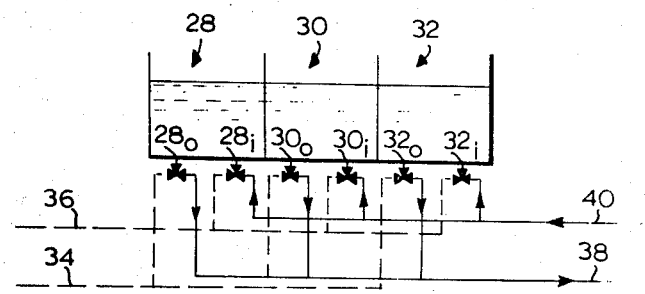
FIGS. 1a, 1b, 1c are three diagrammatic illustrations showing the reservoirs of FIG. 1 at different times during the operation of the system.

Referring first to FIG. 1, the system includes a heating circuit 20, and a cooling circuit 22. A heat energy storage circuit is indicated at 24 and is coupled to both circuits 20 and 22. In addition, the system includes a safety circuit 26 designed to guard against overheating of the system. The heating and cooling medium in the circuits 20 to 26 is water; the solid lines in FIG. 1 represent water pipes.

In this embodiment, circuit 24 includes three heat energy storage reservoirs denoted respectively 28, 30 and 32. Each reservoir has an inlet connection and an outlet connection. The inlet and outlet connections for reservoir 28 are denoted respectively $28_i$ and $28_o$. The connections for the other reservoirs are similarly designated. Each connection is fitted with a three-position valve. The valve for the inlet connection of reservoir 28 is denoted $28_{vi}$ and a valve fitted to the outlet connection is denoted $28_{vo}$; the valves associated with the connections of the other reservoirs are similarly designated.

The heat energy storage circuit 24 includes lines 34 and 36 coupling the reservoirs 28, 30 and 32 with the heating circuit 20 of the system. Similarly, the reservoirs are coupled to the cooling circuit 22 by lines 38 and 40. The primary directions of water flow along these lines are indicated by arrows. It will be remembered that each of the reservoir inlet and outlet valves is a three-position valve. Each valve has two ON positions and one OFF position and is accordingly coupled to two lines. Each of the inlet valves $28_{vi}, 30_{vi}, 32_{vi}$ is coupled by one of these lines to the input line 36 connected to the heating circuit and by the other line to the input line 40 connected to the cooling circuit. Each reservoir output valve ($28_{vo}, 30_{vo}, 32_{vo}$) is similarly coupled to the output line 34 connected to the heating circuit and to the output line 38 connected to the cooling circuit. Accordingly, by appropriately positioning the relevant valves, each reservoir can be coupled with either the heating circuit 20 or with the cooling circuit 22.

Figure 2:
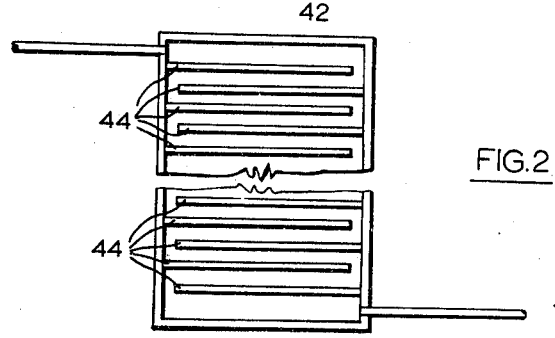
FIG. 2 is a diagrammatic plan view of one of the reservoirs.

Each of the reservoirs 28, 30 and 32 is designed so that liquid entering its inlet connection flows through the reservoir in a column so as to minimize mixing of water already in the reservoir with incoming water at a different temperature. FIG. 2 illustrates one of the reservoirs 28, 30 and 32 in diagrammatic form. Each reservoir includes an outer wall 42 and a plurality of baffles 44. Alternate baffles extend inwardly of the reservoir from opposite side walls thereof and each baffle terminates at a spacing from the side wall opposite that to which it is joined. Accordingly, the baffles define an elongate liquid flow path which is of substantial length and is of convoluted or serpentine form. The inlet and outlet connections of the reservoir are located at opposite ends of the said flow path and liquid entering through the inlet flows along the said path in the form of a column.

Referring back to FIG. 1, the output and input lines 34, 36 respectively of the storage circuit 24 are coupled to a heat exchanger 46. A pump reversible 48 is provided in line 34 so that water from one or more of the reservoirs 28, 30, 32 can be circulated through the heat exchanger 46 and returned to the reservoir(s). The heat exchanger 46 defines two separate water flow paths denoted 48 and 50 between which heat energy can be transferred. Path 48 is connected to the pipes 34 and 36 and path 50 is connected in the heating circuit 20. Circuit 20 includes a so-called "clean" heating condenser 52 (see later), for heating the water in the circuit, and a pump 54 for circulating water unidirectionally in the circuit as indicated by the arrows. An auxiliary heating unit may optionally be included in the circuit as indicated in ghost outline at 56. The building heating load 58 is connected in the circuit downstream of the clean condenser 52 and the heat exchanger is located downstream of the building load. A by-pass line 60 extends around the building load 58 and is controlled by a valve 62.

The cooling circuit 22 includes a heat exchanger 64 which is similar to heat exchanger 46 in that it defines two separate flow paths 66 and 68. Flow path 66 is coupled to the lines 38, 40 of the heat energy storage circuit. A reversible pump 70 is provided for displacing water along path 66. The heat exchanger path 68 is connected in the cooling circuit 22. Circuit 22 includes a "chiller" 72 and a pump 74 for circulating water in the cooling circuit. The building cooling load 76 is connected in circuit 22 downstream of the chiller 62 and the heat exchanger 64 is located downstream of the building load. As in the case of the heating circuit, a by-pass line 78 is provided around the building load and is controlled by a valve 80.

The chiller 72 is basically a conventional refrigeration unit and operates by removing heat energy from the water in the cooling circuit. It will be remembered that the heating circuit includes a "clean" condenser 52. This condenser is in fact part of the chiller 72. The heat energy produced when the chiller is in operation is used to heat the condenser 52, which in turn heats the water in the heating circuit 20. In addition to the clean condenser 54, the chiller includes a so-called "dirty" condenser which forms part of the safety circuit 26. This condenser is denoted 82 and operates to heat water in the safety circuit. The output 84 from the condenser is connected to a cooling tower shown diagrammatically as including a water discharge head 86 and an open water tank 88. The tank includes a drain 90 which is coupled through a pump 92 to the input of the condenser 82. When the pump 92 is in operation, water in the circuit is heated by the condenser 82 and is delivered to the head 86. Water issuing from the head is cooled before it is returned to the condenser from tank 88. It will be appreciated that the condenser 82 is referred to as a "dirty" condenser because the water which passes through it is exposed to the atmosphere when it issues from head 86 and is therefore open to atmospheric contamination. In contrast, the other circuits of the heating and cooling system are closed, with the result that water in those circuits is not liable to atmospheric contamination.

The expressions "heating load" and "cooling load" have been defined above. In this embodiment, the heating load consists of a series of heating coils associated with a forced air blower and ducting for conveying air to appropriate parts of the building. Air is blown over the coils by the blower and is heated before being conveyed to appropriate paths of the building by the ducting. The cooling load consists of cooling coils and similar forced air equipment.

The operation of the heating and cooling system will now be described. It will be assumed that the system is being started up after an inoperative period and that the water in the reservoirs 28, 30 and 32 is at ambient temperature. Reservoir 28 is coupled to the heating circuit 20 and reservoir 32 is coupled to the cooling circuit 22. Reservoir 30 is not in use; its valves $30_{vo}$ and $30_{vi}$ are OFF.

Referring first to the cooling circuit 22, the building load 76 is initially disconnected from the circuit and the chiller 72 is operated to cool the water in the circuit. The water by-passes the building load along line 78 and enters the heat exchanger 64. In passing through the heat exchanger, the cold water removes heat energy from the water in heat exchanger flow path 66. Operation of pump 70 to displace the water in circuit 24 through heat exchanger 64 charges reservoir 30 with cold water.

It will be remembered that chiller 72 is coupled to the clean condenser 52 of the heating circuit 20. Accordingly, heat removed from the water in the cooling circuit 22 by the chiller 72 is transferred to the clean condenser 52 and is used to heat the water in the heating circuit 20. The building heating load 58 is disconnected from the heating circuit at this time and the heated water leaving condenser 52 flows along the by-pass line 60 and into heat exchanger 46. The hot water entering the heat exchanger imparts heat to the water in the flow path 48 of the heat exchanger. Operation of pump 47 at this time serves to charge the reservoir 28 with hot water.

After the reservoirs 28 and 32 have been charged, the building cooling load 76 and heating load 58 are coupled in the respective cooling and heating circuits (assuming that both heating and cooling is required in the building).

For the purposes of illustration only and to facilitate understanding of the invention, it will be convenient to assume that certain temperatures obtain at certain parts of the system as indicated in FIG. 1. Heat losses in the circuits will be neglected. The temperature of the water in reservoir 28 is 100° F and that of the water in reservoir 30 is 40° F. Referring to the heating circuit 20, it will be assumed that water leaving the condenser 52 is at 100° F and that the water temperature drops 10° F in passing through the building load. Water enters the heat exchanger 46 from the building load at 90° F. Water delivered to the heat exchanger 46 from reservoir 28 is at 100° F and raises the temperature of the water in the heating circuit to 95° F as it leaves the heat exchanger. The water returning to reservoir 28 from the heat exchanger is at a lower temperature than the water in the reservoir but mixing of the incoming water with the water already in the reservoir is minimized owing to the design of the reservoir (see above). Assuming that the auxiliary heating unit 58 is not in operation, water leaving the heat exchanger 46 at 95° F will enter the clean condenser 54 at the same temperature and will be heated to 100° F in the condenser. The auxiliary heating unit 56 is used only if extra heating capacity is required in the heating circuit. In fact, it is anticipated that unit 56 will be used only in emergency situations.

Referring now the the cooling circuit 22, it will be assumed that water in the cooling circuit is cooled to 42° F by the chiller 72 and that the heat energy removed from the building load raises the temperature of the water to 60° F on leaving the building load. Accordingly, the water enters the heat exchanger 64 at 60° F.

Water in the reservoir 32 is at a temperature of 40° F and cools the water in the heat exchanger to 54° F at the output side of the heat exchanger. The water returned to the reservoir 32 from the heat exchanger is at a higher temperature than the water remaining in the reservoir, but mixing is minimized as explained above. The water leaving the heat exchanger 64 will enter the chiller 74° at 54° F.

It will be remembered that both the clean condenser 54 of the heating circuit 20 and the dirty condenser 82 of the safety circuit 26 are heated by the chiller 74. In the event that the temperature of the water in the heating circuit becomes too high, the pump 92 of the safety circuit is operated. This causes water to be discharged from the dirty condenser into the cooling tower 88 and removes excess heat from the clean condenser 54 of the heating circuit.

In the event that, for example, no further heating of the building is required, the building is disconnected from the heating circuit and hot water leaving the clean condenser 54 by-passes the heating load by way of by-pass line 60 as described previously. At this time, the heat imparted to the water in the heating circuit by the clean condenser is used to recharge reservoir 28 with hot water.

Similarly, if the cooling load 76 is disconnected from the cooling circuit 22, the water cooled by the chiller 72 can be used to re-charge reservoir 32 with cold water.

The pumps 47 and 70 of the heat energy storage circuit 24 are reversible so that if, for example, water at a lower temperature than the water in reservoir 28 has just been returned to the reservoir, it may be convenient to reverse the direction of pump 47 and return that water to the heat exchanger 46 for reheating. In addition, the speed of operation at the pumps can be varied to vary the rate at which the reservoirs are charged with heat energy or the rate of heat energy depletion as the case may be.

Figure 1B:
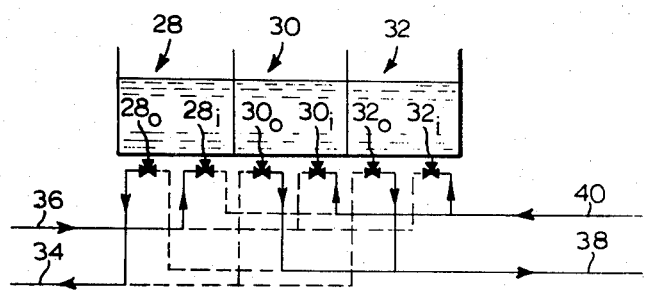
Figure 1C:
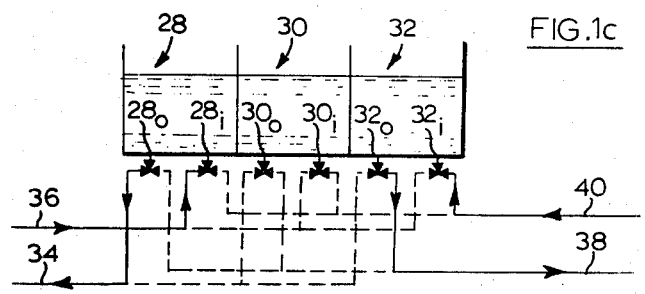

It will be remembered that each of the reservoirs 28, 30 and 32 can be connected either to the heating circuit 20 or to the cooling circuit 22. Accordingly, the heating or cooling capacity of the system can be varied by appropriately connecting the reservoirs to the relevant circuit 20 or 22. FIGS. 1a, 1b and 1c show examples of three ways in which the reservoirs can be connected to the circuits.

In FIG. 1a, the outlet connections of all three reservoirs are coupled to the line 38 connected to the cooling circuit 22. The inlet connections for all three reservoirs are connected to line 40. Assuming that all three reservoirs have been charged with cold water, maximum cooling capacity is available to the cooling circuit with this arrangement.

In the arrangement of FIG. 1b, the inlet and outlet connections 28$_i$ and 28$_o$ of reservoir 28 are coupled respectively to the lines 36 and 34 to the heating circuit, while the other two reservoirs are both connected to the cooling circuit. Reservoir 28 is charged with bot water and reservoirs 30 and 32 are charged with cold water.

Finally, FIG. 1c shows an arrangement in which reservoir 30 has been previously charged with cold water, and is now OFF. The reservoir is now in the STORE mode. Reservoir 28 is coupled to the heating circuit 20 and reservoir 32 is coupled to the cooling circuit 22. The water from reservoir 28 is passed into the heat exchanger 46 (FIG. 1) of the heating circuit and is being used to heat the water in that circuit. The cooling circuit is inoperative at this time and water leaving the reservoir 32 and passing to the heat exchanger 64 of the cooling circuit (FIG. 1) is being cooled by the water in the cooling circuit before being returned to the reservoir. Accordingly, reservoir 32 is being charged with cold water preparatory to being used in the cooling circuit 22.

The modes in which the reservoirs are used will depend on the heating and/or cooling requirements of the building. For example, in winter, maximum heating is required and two of the reservoirs may be used for heating and one for cooling. In summer, on the other hand, all three reservoirs may be used for cooling and in the fall and spring, two reservoirs may be used for cooling and one for heating. An example of a reservoir sequence during the spring or fall is given below. Reservoir 28 is used for heating and reservoirs 30 and 32 are used for cooling. The sequence covers three night/day periods.

| TIME | RESERVOIR #28 HEATING | #30 COOLING | #32 COOLING | CHILLER |
|---|---|---|---|---|
| NIGHT | USE | CHARGE | CHARGE | ON |
| DAY | STORE | OFF | USE | ON |
|  | STORE | USE | OFF | ON |
|  | STORE | USE | USE | ON |
| NIGHT | STORE | CHARGE | CHARGE | ON |
| DAY | USE | OFF | USE | ON |
|  | USE | USE | OFF | ON |
|  | USE | USE | USE | ON |
| NIGHT | STORE | CHARGE | CHARGE | ON |
|  | STORE | CHARGE | CHARGE | ON |
| DAY | USE | OFF | USE | OFF |
|  | USE | USE | OFF | OFF |
|  | USE | USE | USE | OFF |
|  | OFF | USE | USE | OFF |
|  | OFF | USE | USE | OFF |

It is, of course, to be understood that there is no limitation to this particular sequence.

Figure 3:
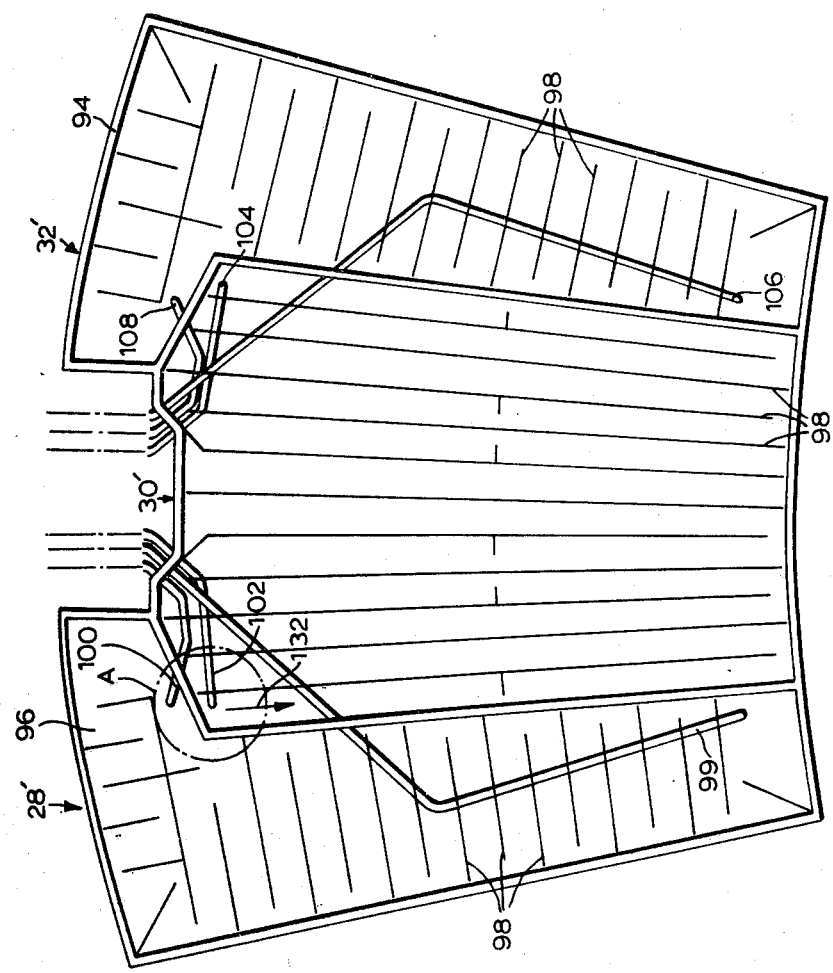
FIG. 3 is a plan view of three heat energy storage reservoirs in an actual heating and cooling system.

Reference will now be made to FIG. 3 which illustrates a practical reservoir installation. The reservoirs are built into the basement of a building in which the heating and cooling system of the invention is used. The reservoirs correspond to the reservoirs 28, 30 and 32 of FIGS. 1, 1a, 1b and 1c and are denoted by the reference numerals 28', 30' and 32'. The reservoirs are defined by a concrete wall 94 which upstands from a concrete floor 96. The reservoirs are provided with a vented cover (not shown in FIG. 3) and are provided with plastic liners. Inside each reservoir is a plurality of alternately arranged baffles 98 arranged to define an elongate flow path of convoluted or serpentine form. The baffles will be more specifically described in connection with FIG. 4. Each reservoir has an inlet connection and an outlet connection. These connections are formed by pipes having downwardly directed outer end portions located below the water level in the reservoir. The inlet connection for reservoir 28' is indicated at 99 and its outlet connection is indicated at 100. The inlet connection for reservoir 30' is denoted 102 and the outlet connection 104. Reservoir 32' has an inlet connection 106 and an outlet connection 108. The connections 100 to 108 are coupled to the heating and cooling circuits of the system in the same manner as indicated in FIG. 1. These circuits are not shown in FIG. 3.

Figure 4:
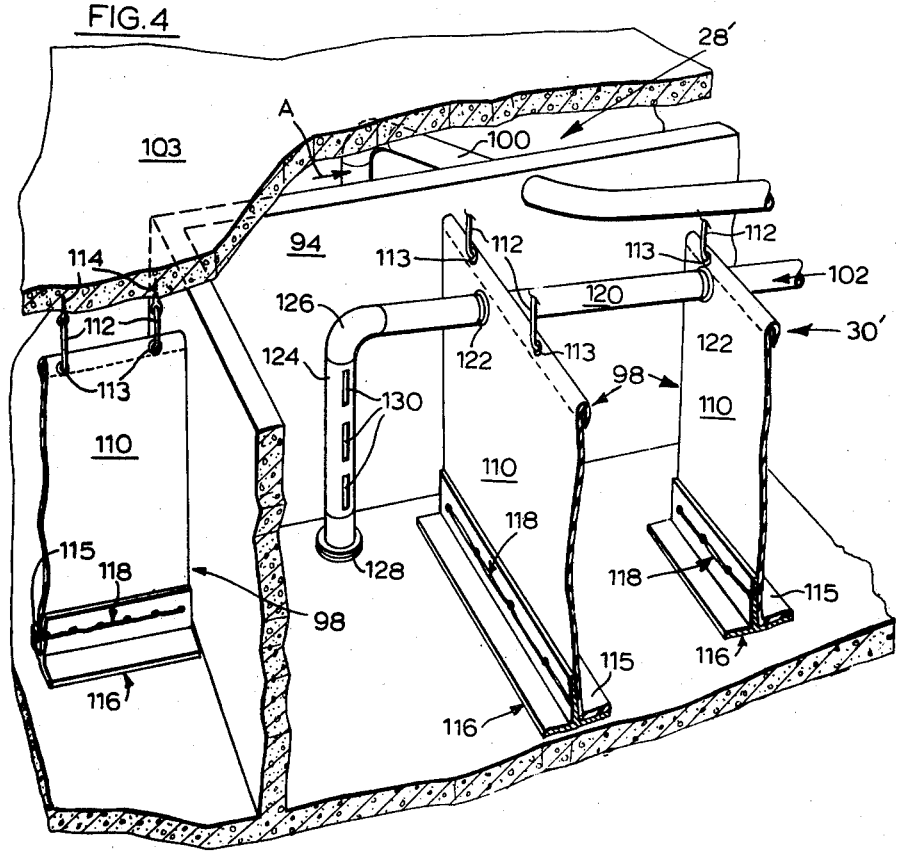
FIG. 4 is a perspective view of the part of FIG. 3 indicated at A.

Reference will now be made to FIG. 4 which is a perspective view approximately of the part of FIG. 3 indicated at A and which shows parts of reservoirs 28' and 30', including the outlet connection 100 of reservoir 28' and the inlet connection 102 of reservoir 30'. Part of the cover for the reservoirs is visible at 103. In addition, a number of the baffles 98 are visible. Part of the wall 94 defining the reservoir can also be seen.

Each of the baffles 98 is made up of a sheet 110 of fibreglass-reinforced rubber suspended from the cover 103 by suspension elements 112. The upper margin of each sheet 110 is folded over and stitched to the remainder of the sheet to form a tubular portion through which eyelets 113 are fitted. The lower ends of the elements 112 are hook-shaped and are engaged in the eyelets. The upper ends of the elements 112 engage eye bolts 114 embedded in the cover 103. The lower margin of each sheet is directed laterally to form a flap 115 and is attached to a section 116 of inverted T-shape secured by adhesive to the bottom of the reservoir. The sheet is attached to the stem of section 116 by lacing indicated generally at 118 passing through apertures in said stem and aligned eyelets in the sheet. It will be noted that the baffle 98 which is visible at the right-hand side of FIG. 4 terminates short of the wall 94 in a free edge, providing the required clearance between the end of the baffle and the wall in accordance with the baffle configuration (see FIG. 3).

The inlet pipe 102 of reservoir 30' which is visible in FIG. 4, is typical of the three reservoir connections and will now be described as representative of all of the connections. Connection 102 includes a horizontal pipe portion 120, and an upright portion 124 which is connected to the horizontal portion 122 by an elbow 126. The pipe portion 120 passes through apertures in two of the baffles 98, and each baffle is secured to the pipe by a clamp 122 fitted around the pipe. The lower end of portion 124 is closed by a blind flange 128. Three vertically aligned slots 130 are provided in one side of the vertical portion 124 of the inlet to form defuser outlets for water entering the reservoir. The slots 130 are arranged so that water flowing out of the slots is directed horizontally along the elongate fluid flow path defined by the baffles 98. Referring back to FIG. 3, the direction of the fluid flowing from the outlet slots 130 is indicated by arrow 132.

Figure 5:
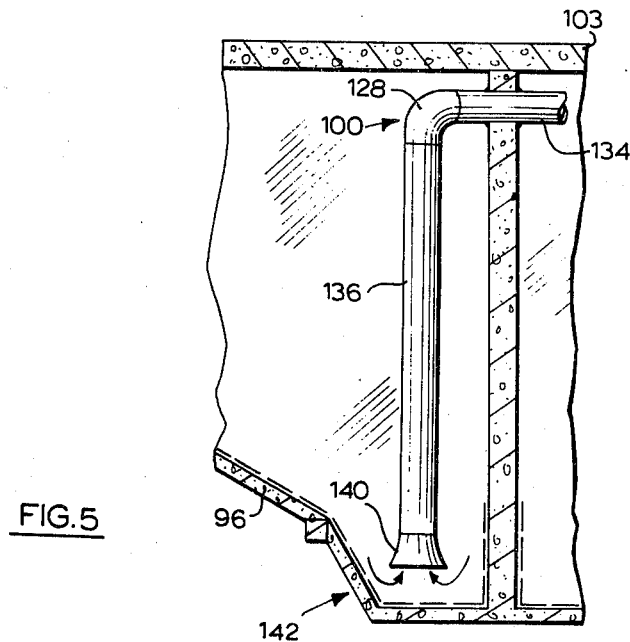
FIG. 5 is a view in the direction of arrow 'A' in FIG. 4.

FIG. 5 shows the outlet connection 100 of reservoir 28'. This connection is representative of all three outlet connections of the reservoirs of FIG. 3. It will be noted that the connection includes a horizontal pipe portion 134 and a vertical portion 136 coupled to the horizontal portion by an elbow 138. As can be seen from FIG. 4, this portion passes through an aperture in reservoir wall 94 and the aperture is sealed to the pipe. The lower end of the vertical portion 136 is fitted with a flared inlet 140. The floor 96 of the reservoir is formed to define a recess 142 in which the lower end of the outlet connection 100 is located. This recess is designed to minimize turbulence as water enters the outlet pipe 100.

Figure 6:
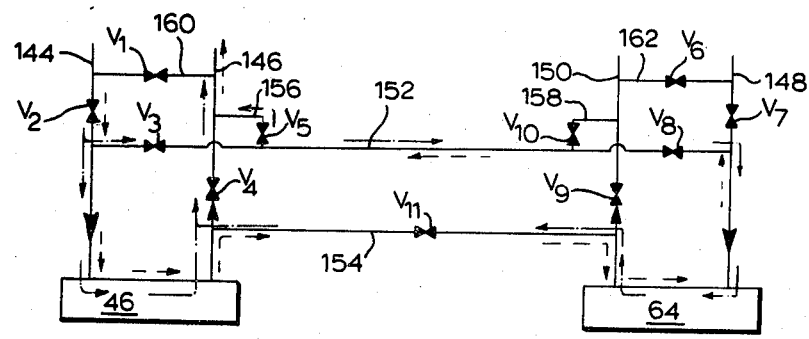
FIG. 6 is a diagrammatic illustration of a modification of the system of FIG. 1.

Finally, FIG. 6 illustrates a modification of the system shown in FIG. 1. This modification allows the two heat exchangers of the system to be coupled together in series or in parallel in either the heating circuit 20 or in the cooling circuit 22, so that additional heating or cooling capacity (as the case may be) can be extracted from the heat storage reservoirs 28, 30, 32. It might be desirable to connect the heat exchangers in this way for the following reasons:

Referring, for example, to the heating circuit 20, there is a limit on the maximum temperature rise which can occur as the water in the heating circuit passes through the heat exchanger 46. For a particular circuit, this limit may be in the region of 8°. However, if the water in the heating circuit can be passed through both heat exchangers 46 and 64 and if both heat exchangers are coupled to heat energy storage reservoirs containing hot water, it may be possible to obtain a temperature rise of, say, 6° in each heat exchanger, whereby the total temperature rise of the liquid in the heating circuit is 12°. Similar considerations apply in connection with the cooling circuit 22.

FIG. 6 shows the heat exchangers 46 and 64 of FIG. 1. The lines of the heating circuit 20 coupled to the heat exchanger 46 are denoted 144 and 146 and the lines of the cooling circuit 22 coupled to the heat exchanger are indicated at 148 and 150. For clarity of illustration, the remainder of the system has not been illustrated, although it is to be understood that it will be as shown in FIG. 1.

According to FIG. 6, line 144 of the heating circuit is coupled to line 148 of the cooling circuit by a cross-connection 152. Similarly, a connection 154 extends between line 146 of the heating circuit and line 150 of the cooling circuit. A by-pass connection 156 is provided between line 146 and line 152 and a similar connection 158 is provided between line 150 and line 152. In addition, the two lines 144 and 146 of the heating circuit are connected by a line 160 and the lines 148 and 150 of the cooling circuit are connected by a similar line 162. Valves $V_1$ and $V_{11}$ are provided in the lines and are positioned as shown.

Assume that the water in the heating circuit 20 is to be passed in series through the two heat exchangers 46 and 64. At this time, both of the heat exchangers would be connected to one or more of the reservoirs 28, 30, 32, containing hot water. The conditions of the valves $V_1$ to $V_{11}$ are as follows:

| | |
|---|---|
| $V_1$ | closed |
| $V_2$ | open |
| $V_3$ | closed |
| $V_4$ | closed |
| $V_5$ | open |
| $V_6$ | open |
| $V_7$ | closed |
| $V_8$ | open |
| $V_9$ | closed |
| $V_{10}$ | closed |
| $V_{11}$ | open |

Water flowing in the heating circuit in the direction of the arrow in line 146 will then follow the path indicated in FIG. 6 by dotted arrows, flowing through the heat exchanger 46 and then through heat exchanger 64 and returning to line 146 of the cooling circuit.

If the heat exchangers are to be used in parallel the valves will be arranged as follows:

| | |
|---|---|
| $V_1$ | closed |
| $V_2$ | open |
| $V_3$ | open |
| $V_4$ | open |
| $V_5$ | closed |
| $V_6$ | open |
| $V_7$ | closed |
| $V_8$ | open |
| $V_9$ | closed |
| $V_{10}$ | closed |
| $V_{11}$ | open |

With the valves arranged in this way, the water will flow into the heat exchanger 46 along line 144 and out along line 146 in the normal manner. In addition, some of the water flowing in line 144 will flow along line 152 through heat exchanger 64, back along line 154, and into line 146. This flow path is indicated by chain line arrows in FIG. 6.

It will be appreciated that the water in the cooling circuit can be similarly arranged to flow through both of the heat exchangers, either in series or in parallel by differently arranging the valves $V_1$ to $V_{10}$.

When the heat exchangers are coupled respectively to the heating circuit and to the cooling circuit, valves $V_3$, $V_8$, and $V_{11}$ are closed.

The heating and cooling system is preferably automatically controlled. Temperature sensors are provided at appropriate parts of the system and the readings from these sensors are used to operate the valves of the system in accordance with the heating and cooling requirements of the building. Automatic computer control may be utilized and may have a capability for predicting the temperature requirements of the building and automatically controlling the heating and cooling system in accordance with the projected requirements. The control means form no part of the present invention and will not therefore be described. A suitable control means is described and claimed in U.S. Pat. No. 3,998,267.

It will be appreciated that the heating and cooling system provided by the invention is economical in terms of the power consumption of the system. The chiller may be operated at a constant, relatively low level. Heat energy stored in the energy storage reservoirs may be used in the heating and cooling circuits to assist the operation of the chiller.

It will also be appreciated that the preceding description applies to a specific embodiment of the invention and that variations are possible within the broad scope of the invention.

In the specific embodiment described above, the heat energy storage reservoirs are coupled to the heating and cooling circuits by way of heat exchangers. It is, however, to be understood that within the broad scope of the invention, one or more of the reservoirs could be coupled directly to a heating or cooling circuit. The fluid in the heating or cooling circuit would then also flow in the reservoir(s). In that event, it may be necessary to provide a by-pass so that fluid in the circuit can by-pass the reservoir(s).

In any event, the number of reservoirs may vary, depending on the heat energy storage requirements of the system. The reservoirs may be completely separate from one another in contrast to the arrangement illustrated in the drawings.

Further, it is to be understood that the baffles may be made of materials other than that specifically referred to above. In another embodiment, for example, it may be desirable to make the baffles of a material having a high degree of thermal insulation so as to minimize heat energy transfer through the baffles. This material may be a fabric. In a still further embodiment, the reservoir and baffles may be of integral concrete construction.

In the specific embodiment described above, water is used in the heating circuit, in the cooling circuit, and in the reservoirs. It is, however, to be understood that any other suitable fluid may be used. It may be possible to use air or another gas.

In each of the heating and cooling circuits described above, the liquid circulates unidirectionally and the heat exchanger is located downstream of the building load. However, it is to be understood that this is not essential. The liquid may be circulated in the opposite direction to that described, or, if the direction remains the same, the heat exchanger may be located upstream of the building load. In this event, referring to the heating circuit, the heating means operates at a higher temperature when charging the reservoir than when heating the building.

It is also to be noted that although the preceding description relates to a combined heating and cooling system, a heating system or a cooling system having one or more heat energy storage reservoirs may be provided within the broad scope of the invention.

What we claim is:

1. In a system for controlling the temperature of a building having a heating load or a cooling load, the system including: a circulation circuit for a temperature control fluid; means in said circuit for varying the heat energy in said fluid; and means for circulating said fluid in said circuit; the building load being connectible in said circuit so that said fluid can pass through the building load;

the improvement comprising a heat energy storage reservoir containing a fluid, the reservoir comprising a tank having therein a plurality of upright baffles disposed in spaced, generally parallel positions, each baffle extending from the bottom of the tank to a position above the level of the fluid, and from an upright wall of the tank to a position spaced from an opposite upright wall so that the baffles together define an elongate fluid flow path of serpentine form along which the fluid can flow in the form of a column in a generally horizontal direction, the tank having an inlet connection communicating with one end of said path and an outlet connection communicating with the opposite end of said path, said inlet and outlet connections of the reservoir being coupled to said circulation circuit so that heat energy derived from said circuit can be stored in the reservoir for subsequent transfer back to the said circuit to assist the action of said heat energy varying means.

2. The invention of claim 1, further comprising heat exchange means in said circulation circuit for said temperature control means the heat energy storage reservoir being coupled to said circulation circuit by way of said heat exchange means, whereby heat energy may be transferred between the temperature control fluid and the reservoir fluid in said heat exchange means.

3. The invention of claim 1, wherein the heat energy storage reservoir is coupled directly in said circulation circuit whereby said temperature control fluid flows through the reservoir.

4. A system for controlling the temperature of a building having a building heating load or a building cooling load, the system comprising:

a temperature control circuit for a temperature control fluid, the building load being connectible in said circuit so that the said fluid can pass through the building load, and the circuit including: means for varying the heat energy in said fluid; and means for circulating said fluid in said circuit;

a heat energy storage reservoir containing a fluid, the reservoir comprising a tank having therein a plurality of upright baffles disposed in spaced, generally parallel positions, each baffle extending from the bottom of the tank to a position above the level of the fluid, and from an upright wall of the tank to a position spaced from an opposite upright wall so that the baffles together define an elongate fluid flow path of serpentine form along which the fluid can flow in the form of a column in a generally horizontal direction, the tank having an inlet connection communicating with one end of said path and an outlet connection communicating with the opposite end of said path;

heat exchange means coupled in said temperature control circuit between said heat energy varying means and the building load; said inlet and outlet connections of said reservoir being coupled with said heat exchange means to form a circulation circuit for said fluid, so that heat energy can be transferred between the fluid in said circulation circuit and the fluid in said temperature control circuit; and, means for displacing said fluid in the reservoir along said flow path of the reservoir and through the heat exchange means;

whereby heat energy can be transferred between the said fluids in said heat exchange means and stored in the fluid in the reservoir for subsequent transfer back to the fluid in said temperature control circuit to assist the action of said heat energy varying means.

5. A system as claimed in claim 1, wherein the tank is made of concrete and is provided with a plastic liner.

6. A system as claimed in claim 1, wherein the said baffles in the heat energy storage reservoir are formed by a plurality of sheets suspended in upright positions in the reservoir.

7. A system as claimed in claim 6, wherein each said sheet is suspended from an element which extends across the reservoir, and is restrained at its lower margin by means secured to the floor of the reservoir.

8. In a building having a system for heating a building heating load, the system including: a heating circuit for a heating fluid; means in said circuit for heating said fluid; and means for circulating said fluid unidirectionally in said heating circuit; the building load being connectible in said heating circuit downstream of said heating means;

the improvement wherein a heat energy storage circuit is associated with said heating circuit, said heat energy storage circuit including:

a heat energy storage reservoir containing a fluid, the reservoir comprising a tank having therein a plurality of upright baffles disposed in spaced, generally parallel positions, each baffle extending from the bottom of the tank to a position above the level of the fluid, and from an upright wall of the tank to a position spaced from an opposite upright wall so that the baffles together define an elongate fluid flow path of serpentine form along which the fluid can flow in the form of a column in a generally horizontal direction, the tank having an inlet connection communicating with one end of said path and an outlet connection communicating with the opposite end of said path;

heat exchange means coupled in said heating circuit downstream of the building load and coupled to said inlet and outlet connections of the reservoir so that heat energy can be transferred between the fluid in said heat storage circuit and the fluid in said heating circuit;

means for displacing the fluid in the heat storage circuit along said elongate flow path of the reservoir and through the heat exchange means;

whereby, with the building heating load disconnected from said heating circuit and said heating means in operation, heat energy can be transferred to said fluid in the heat storage circuit from the fluid in the heating circuit and said reservoir can be charged with heated fluid, said fluid being stored in the reservoir until the building load is connected in said heating circuit, whereupon the stored heated fluid can be returned to the heat exchange means to heat said fluid in the heating circuit and compensate at least in part for the reduction in temperature of the fluid which occurs due to the passage of the fluid through the building heating load.

* * * * *